(12) United States Patent
Zhou (10) Patent No.: US 12,394,966 B1
(45) Date of Patent: Aug. 19, 2025

(54) SEALING DEVICE FOR CHARGING PILE INTERFACE

(71) Applicant: ADM TECH LLC, Monterey Park, CA (US)

(72) Inventor: Min Zhou, Monterey Park, CA (US)

(73) Assignee: ADM TECH LLC, Monterey Park, CA (US)

( * ) Notice: Subject to any disclaimer, the term of this patent is extended or adjusted under 35 U.S.C. 154(b) by 0 days.

(21) Appl. No.: 19/019,539

(22) Filed: Jan. 14, 2025

(30) Foreign Application Priority Data

Nov. 19, 2024 (CN) .......................... 202422811442.6

(51) Int. Cl.
*H02G 15/013* (2006.01)

(52) U.S. Cl.
CPC ................................ *H02G 15/013* (2013.01)

(58) Field of Classification Search
None
See application file for complete search history.

(56) References Cited

U.S. PATENT DOCUMENTS

| | | | | |
|---|---|---|---|---|
| 2,128,040 A | * | 8/1938 | Conners | H02G 3/065 411/436 |
| 4,006,956 A | * | 2/1977 | Allgaier | F16L 47/22 439/455 |
| 4,293,151 A | * | 10/1981 | Manzel | H02G 3/0683 174/665 |
| 4,568,047 A | * | 2/1986 | Matsui | H02G 3/083 174/153 G |
| 4,929,195 A | * | 5/1990 | Seidoh | H01R 13/6599 439/906 |
| 5,108,313 A | * | 4/1992 | Adams | H01R 13/514 439/906 |
| 5,295,859 A | * | 3/1994 | Kawai | H01R 13/506 439/447 |

(Continued)

FOREIGN PATENT DOCUMENTS

| | | | | |
|---|---|---|---|---|
| CN | 105958258 A | * | 9/2016 | ......... B60R 16/0222 |
| CN | 108695799 A | * | 10/2018 | ........... H02G 15/013 |

(Continued)

OTHER PUBLICATIONS

Original and Translation of DE102011103351 (Year: 2011).*

*Primary Examiner* — Timothy J. Dole
*Assistant Examiner* — Muhammed Azam
(74) *Attorney, Agent, or Firm* — Bayramoglu Law Offices LLC (57) ABSTRACT

A sealing device for a charging pile interface includes a charging pile housing, where an upper end of the charging pile housing is fixedly connected to an upper cover through a bolt; left and right sides of the charging pile housing are fixedly provided with interfaces, respectively; two power cords are provided in the interfaces on the left and right sides, respectively; a sealing ring is embedded between the interface and the power cord to ensure sealing; each of left and right sides of an inner bottom of the charging pile housing is fixedly provided with a fixed buckle; and the fixed buckle is detachably connected to a detachable buckle. In the sealing device, the fixed buckle and the detachable buckle are fixed, such that the fixed buckle and the detachable buckle make the sealing ring abut against the interface.

8 Claims, 8 Drawing Sheets

(56) References Cited

U.S. PATENT DOCUMENTS

| | | | | |
|---|---|---|---|---|
| 5,609,499 | A * | 3/1997 | Tan | H01R 13/6658 |
| | | | | 439/445 |
| 5,797,771 | A * | 8/1998 | Garside | H01R 13/6275 |
| | | | | 439/607.46 |
| 5,832,081 | A * | 11/1998 | Zoiss | H02G 15/007 |
| | | | | 379/438 |
| 6,231,374 | B1 * | 5/2001 | Kuo | H01R 13/5816 |
| | | | | 439/455 |
| 6,492,590 | B1 * | 12/2002 | Cheng | H01R 13/6658 |
| | | | | 52/27 |
| 6,595,789 | B2 * | 7/2003 | Oota | H01R 13/5205 |
| | | | | 439/607.41 |
| 6,902,423 | B2 * | 6/2005 | Castaldo | H01R 13/5829 |
| | | | | 439/467 |
| 7,713,081 | B2 * | 5/2010 | Chen | H01R 9/0527 |
| | | | | 439/468 |
| 7,727,003 | B2 * | 6/2010 | Ceroll | B25F 5/00 |
| | | | | 439/456 |
| 8,348,695 | B2 * | 1/2013 | Puzio | H02G 15/007 |
| | | | | 439/449 |
| 9,048,651 | B2 * | 6/2015 | Turner | H01R 13/5833 |
| 9,781,855 | B2 * | 10/2017 | Fan | H05K 5/0247 |
| 9,954,307 | B2 * | 4/2018 | Tait | H01R 13/506 |
| 10,033,118 | B2 * | 7/2018 | Jager | H01R 24/64 |
| 2002/0042222 | A1 * | 4/2002 | Lin | H01R 13/5845 |
| | | | | 439/470 |
| 2003/0003796 | A1 * | 1/2003 | Zoiss | H04M 1/15 |
| | | | | 439/455 |
| 2007/0285906 | A1 * | 12/2007 | Deverall | H05K 1/181 |
| | | | | 361/760 |
| 2011/0061982 | A1 * | 3/2011 | Cheng | H02G 11/02 |
| | | | | 191/12.2 R |
| 2023/0146927 | A1 * | 5/2023 | Gotadoro | H01R 13/745 |
| | | | | 174/668 |

FOREIGN PATENT DOCUMENTS

| | | | | |
|---|---|---|---|---|
| CN | 209267135 | U | | 8/2019 |
| CN | 117154881 | A * | | 12/2023 |
| DE | 102011103351 | B3 * | 9/2012 | ........... H02G 15/013 |
| FI | 119040 | B * | | 11/2007 |
| FR | 1401957 | A * | | 6/1965 |
| FR | 2764456 | A1 * | 12/1998 | ........... H02G 15/007 |
| GB | 1124985 | A * | | 8/1968 |
| GB | 2327305 | A * | 1/1999 | ........... H02G 15/007 |
| NL | 171506 | C * | | 4/1983 |
| TW | 201306409 | A * | 2/2013 | ........... H02G 15/013 |

* cited by examiner

SEALING DEVICE FOR CHARGING PILE INTERFACE

CROSS REFERENCE TO THE RELATED APPLICATIONS

This application is based upon and claims priority to Chinese Patent Application No. 202422811442.6, filed on Nov. 19, 2024, the entire contents of which are incorporated herein by reference.

TECHNICAL FIELD

The present disclosure relates to the technical field of sealing devices, and in particular to a sealing device for a charging pile interface.

BACKGROUND

A rubber sealing ring of a charging pile interface is used to protect key components of an internal wiring of a charging pile, thereby preventing electrical components from being corroded and contaminated by the outside world and ensuring charging safety. Therefore, the use of a sealing ring at a charging pile interface is directly related to the service life and charging safety of the charging pile.

For example, Chinese patent CN209267135U discloses a flange type waterproof joint for a charging pile. The flange type waterproof joint includes a joint body and a locking nut. The joint body has one end provided with an external threaded interface and the other end provided with a tube fitting of a flange. An end surface of the flange is provided with a sealing ring groove. An O-shaped sealing ring is embedded in the sealing ring groove. The locking nut is connected to the external thread interface of the joint body through a thread. An annular gasket and an annular sealing element are provided successively and coaxially in the locking nut. The flange is provided with four connecting holes. Bolts are provided in the connecting holes and connected to welded waterproof nuts inside a charging pile cabinet.

However, this technology has the following problem. Since there is no fixing assembly for the sealing ring, the sealing ring is prone to loosening or even falling off due to long-term external pulling of the wiring.

In view of this, the present disclosure provides a sealing device for a charging pile interface to solve the above problem.

SUMMARY

In view of the defect in the prior art, an objective of the present disclosure is to provide a sealing device for charging pile interface.

To achieve the above objective, the present disclosure is implemented by the following technical solution.

An upper end of a charging pile housing is fixedly connected to an upper cover through a bolt, where left and right sides of the charging pile housing are fixedly provided with interfaces, respectively; two power cords are provided in the interfaces on the left and right sides, respectively; and a sealing ring is embedded between the interface and the power cord to ensure sealing; and each of left and right sides of an inner bottom of the charging pile housing is fixedly provided with a fixed buckles; and the fixed buckle is detachably connected to a detachable buckle.

Furthermore, the sealing ring has an I-shaped cross-section; and outer diameters of left and right sides of the sealing ring are both greater than an inner diameter of the interface.

Furthermore, the fixed buckle is located at a lower end of the detachable buckle; a middle portion of the fixed buckle and a middle portion of the detachable buckle are symmetrically provided with arc-shaped slots; and the arc-shaped slots are fit and in contact with the power cord.

Furthermore, a side of the fixed buckle adjacent to the interface is fixedly provided with a baffle.

Furthermore, two baffles are provided on front and rear sides of the fixed buckle, respectively.

Furthermore, front and rear sides of the detachable buckle are fixedly provided with bumps, respectively; and the bump abuts against the baffle.

Furthermore, lower ends of the bumps on the front and rear sides are provided with inclined surfaces, respectively; inclined elements are respectively provided between the detachable buckle and upper ends of the bumps on the front and rear sides; and the inclined surfaces and the inclined elements abut against the baffle.

Furthermore, the fixed buckle and the detachable buckle are detachably connected through a screw.

The detachable buckle is locked to the fixed buckle through the screw. The inclined surface, the inclined element, and the baffle cooperate with each other to allow the detachable buckle to move laterally so as to compress the sealing ring. In this way, the sealing ring is tightly connected to an inner wall of the interface, achieving better waterproof effect.

Furthermore, the front and rear sides of the fixed buckle are provided with threaded holes, respectively; and the front and rear sides of the detachable buckle are provided with blind holes matched with the threaded holes of the fixed buckle and serve as screw fastening holes.

Furthermore, sawteeth are provided in the arc-shaped slot of the detachable buckle. The detachable buckle is locked to the fixed buckle through the screws. The sawtooth of the detachable buckle presses down on the power cord to prevent the power cord from loosening due to a user pulling the power cord.

Compared with the prior art, the present disclosure has the following beneficial effects. In the present disclosure, during use, the power cord is located at an inner side of the interface. The sealing ring is embedded between the interface and the power cord to ensure sealing. The fixed buckle and the detachable buckle are fixed to make the sealing ring abut against the interface, ensuring the sealing of the interface.

In the present disclosure, the fixed buckle and the detachable buckle are fixed, such that the fixed buckle and the detachable buckle make the sealing ring abut against the interface, ensuring the internal sealing of the charging pile interface and improving the waterproof performance of the charging pile interface.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show some embodiments of the present disclosure, and those skilled in the art may still derive other drawings from these drawings without creative efforts.

REFERENCE NUMERALS 1. charging pile housing; 2. upper cover; 3. interface; 4. power cord; 5. sealing ring; 6. fixed buckle; 7. detachable buckle; 8. baffle; 9. bump; 91. inclined surface; 92. inclined element; 10. sawtooth; and 11. screw.

DETAILED DESCRIPTION OF THE EMBODIMENTS

In order to make the objectives, technical solutions, and advantages of the embodiments of the present disclosure clearer, the technical solutions in the embodiments of the present disclosure are clearly and completely described below with reference to the drawings in the embodiments of the present disclosure. Apparently, the described embodiments are a part, rather than all of the embodiments of the present disclosure. All other embodiments obtained by those of ordinary skill in the art based on the embodiments of the present disclosure without creative efforts shall fall within the protection scope of the present disclosure.

The terms "left", "right", "front", "back", "up", and "down" mentioned in the following description are defined based on the perspective direction of the front view.

Embodiment 1: In some embodiments, referring to FIGS. 1 to 8 of the specification, a sealing device for a charging pile interface includes charging pile housing 1. An upper end of the charging pile housing 1 is fixedly connected to upper cover 2 through a bolt. Left and right sides of the charging pile housing 1 are fixedly provided with interfaces 3, respectively. Two power cords 4 are provided in the interfaces 3 on the left and right sides, respectively. Sealing ring 5 is embedded between the interface 3 and the power cord 4 to ensure sealing. The power cord 4 is connected to a circuit board inside the charging pile housing 1.

Each of left and right sides of an inner bottom of the charging pile housing 1 is fixedly provided with fixed buckle 6. The fixed buckle 6 is detachably connected to detachable buckle 7.

In the present disclosure, during use, the power cord 4 is located at an inner side of the interface 3. The sealing ring 5 is embedded between the interface 3 and the power cord 4 to ensure sealing. The fixed buckle 6 and the detachable buckle 7 are fixed to make the sealing ring 5 abut against the interface 3, ensuring the sealing of the interface 3 and strengthening the waterproof performance of the charging pile interface.

Figure 1:
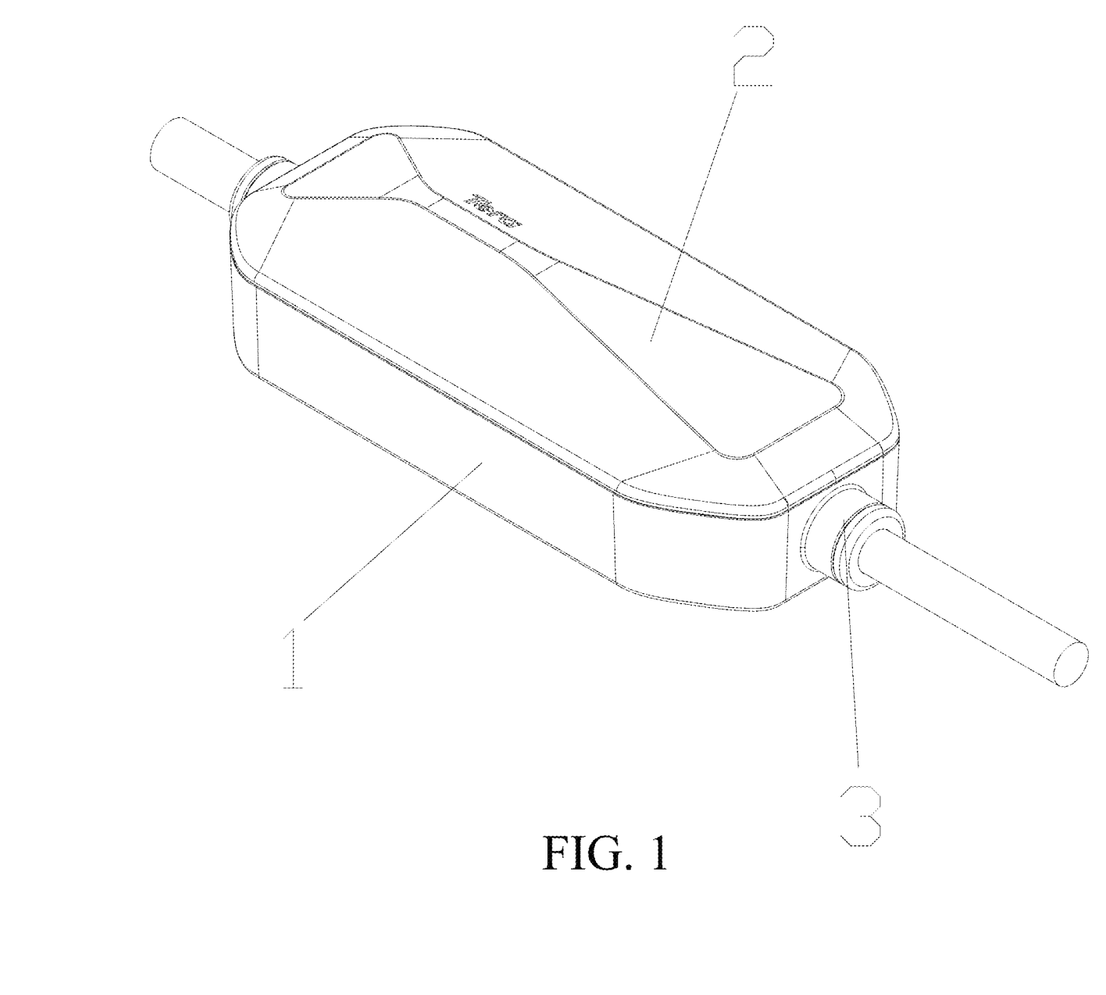
FIG. 1 is a stereoscopic view of a sealing device for a charging pile interface according to the present disclosure.
Figure 2:
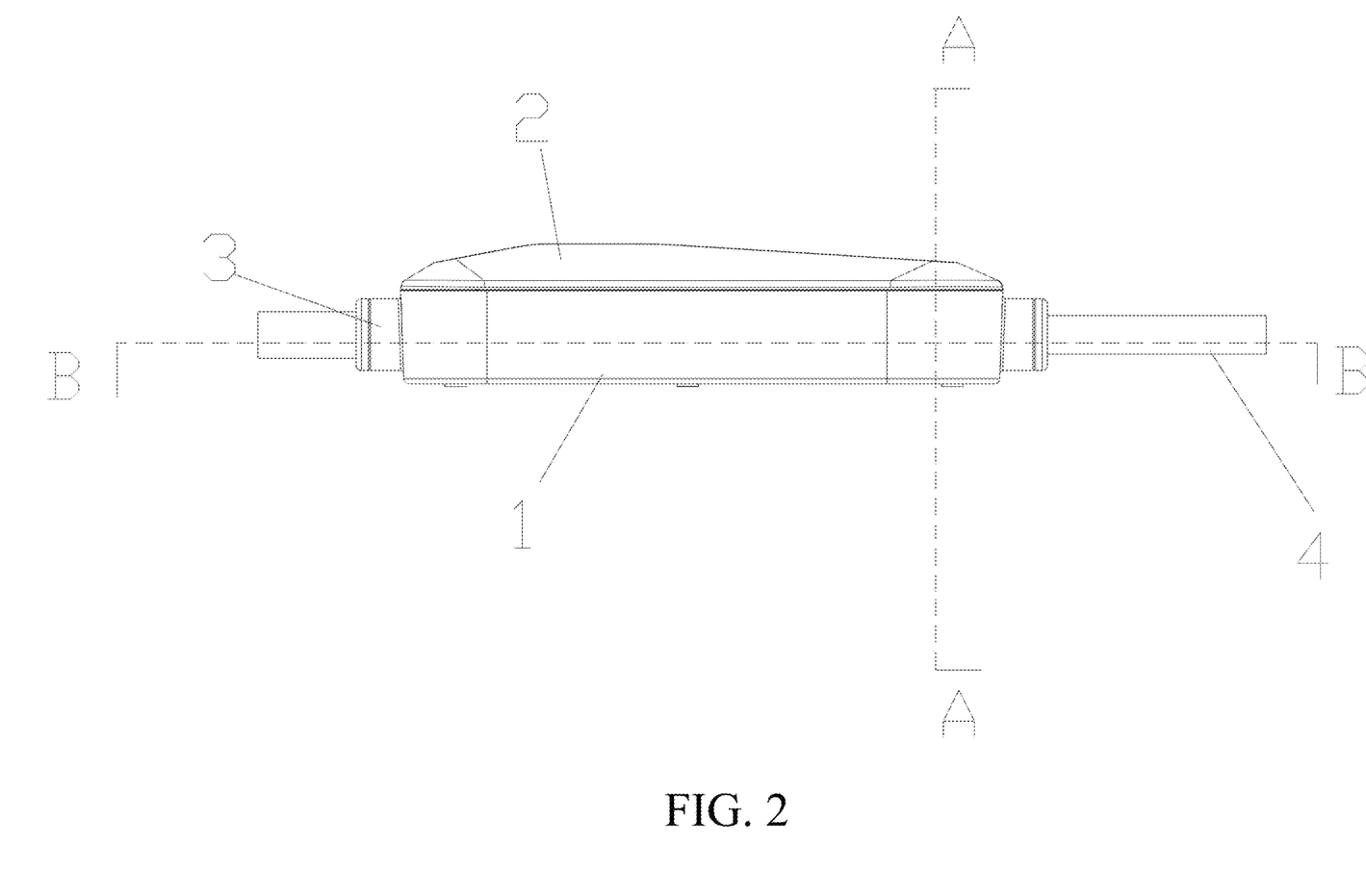
FIG. 2 is a front view of the sealing device for a charging pile interface according to the present disclosure.
Figure 3:
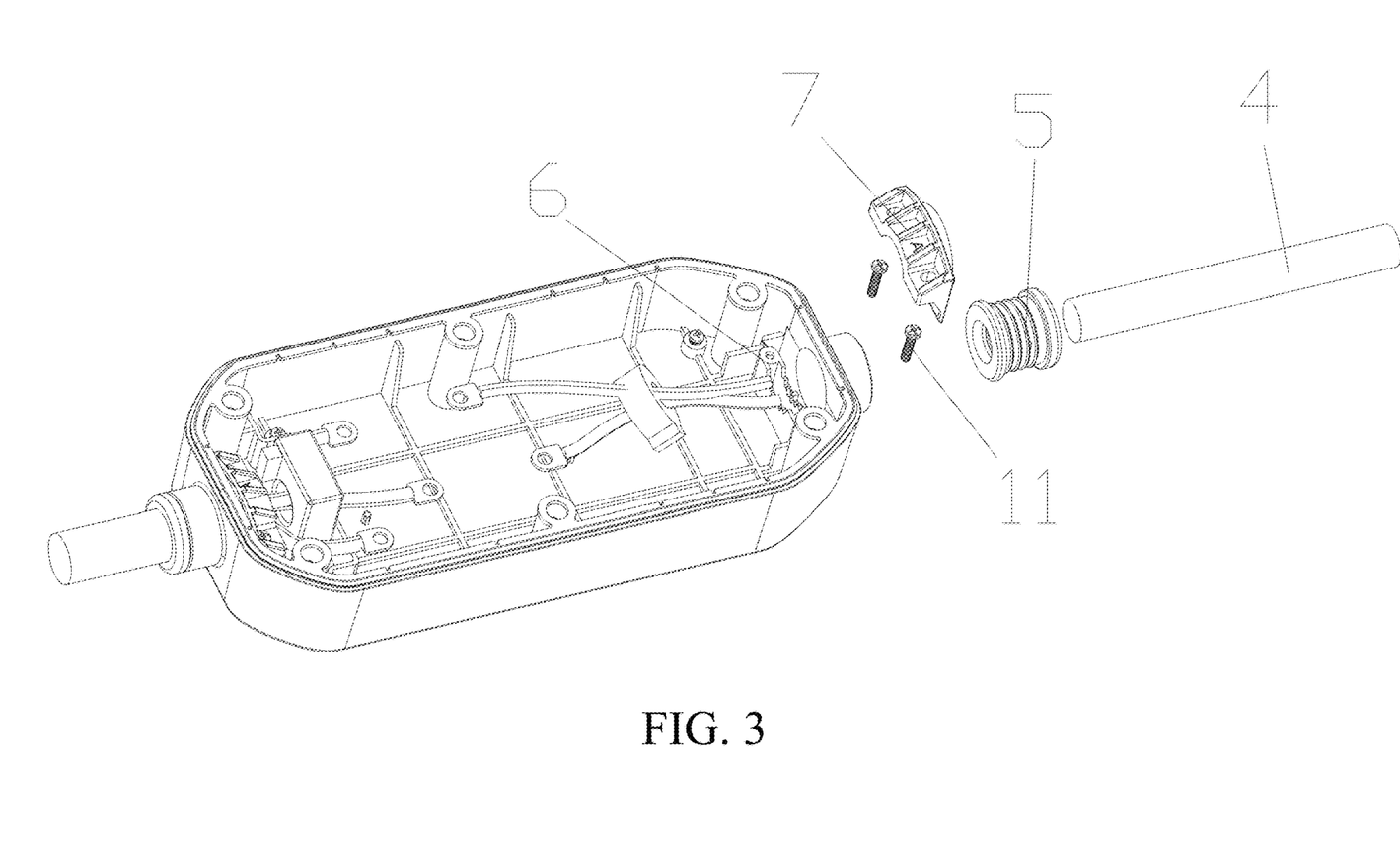
FIG. 3 is an exploded view of the sealing device for a charging pile interface, with an upper cover removed, according to the present disclosure.
Figure 4:
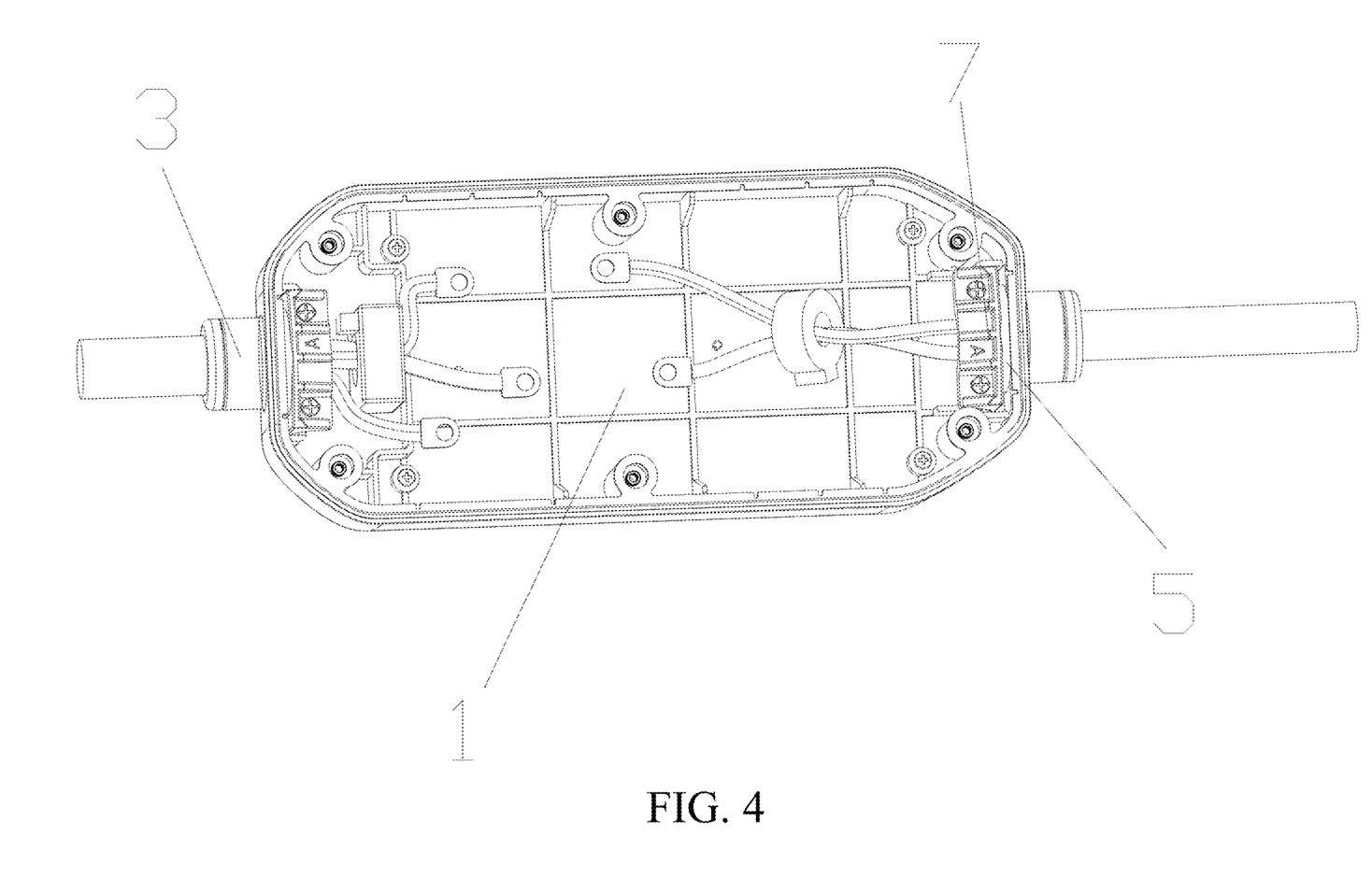
FIG. 4 is a stereoscopic view of the sealing device for a charging pile interface, with the upper cover removed, according to the present disclosure.
Figure 5:
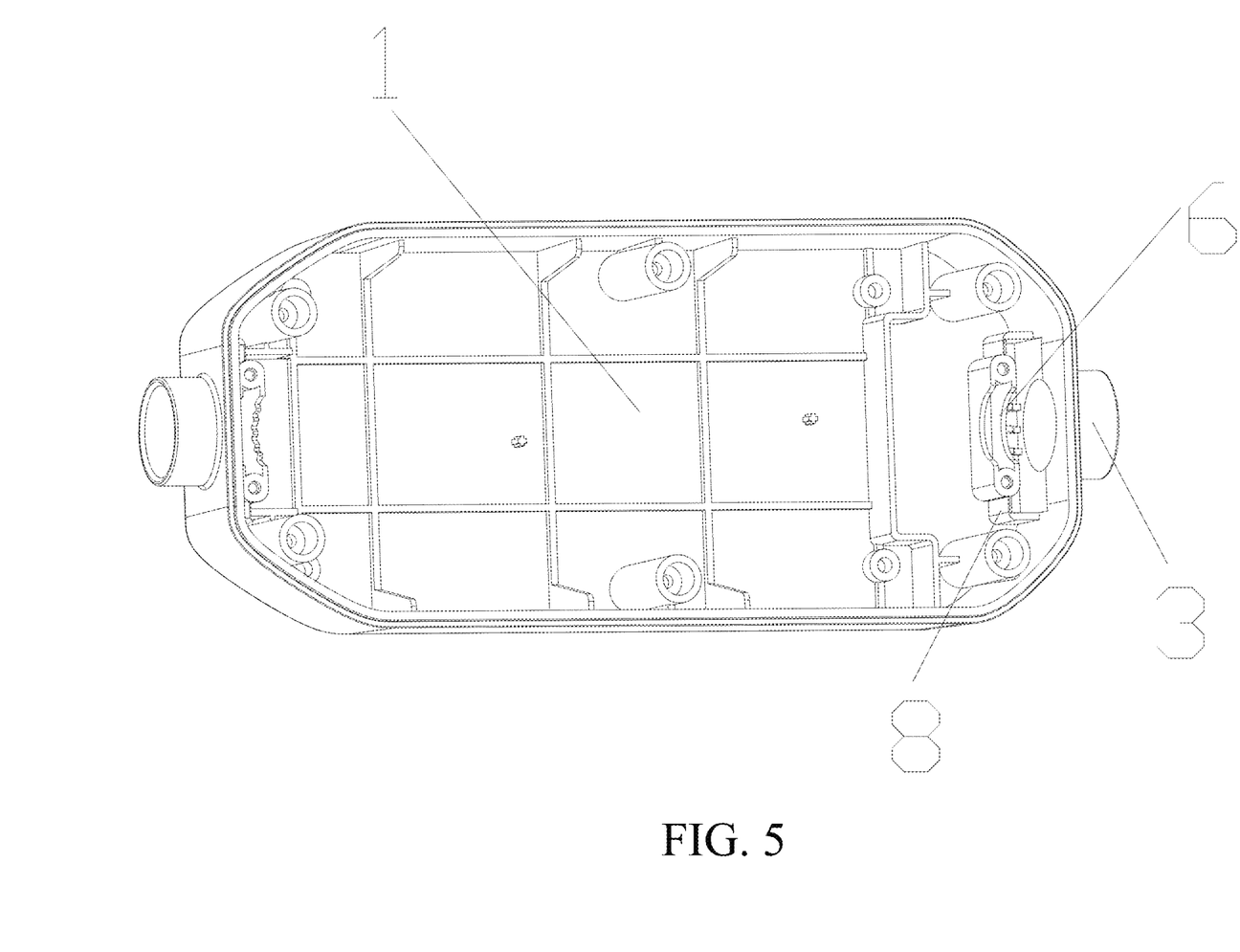
FIG. 5 is a stereoscopic view of a charging pile housing according to the present disclosure.
Figure 8:
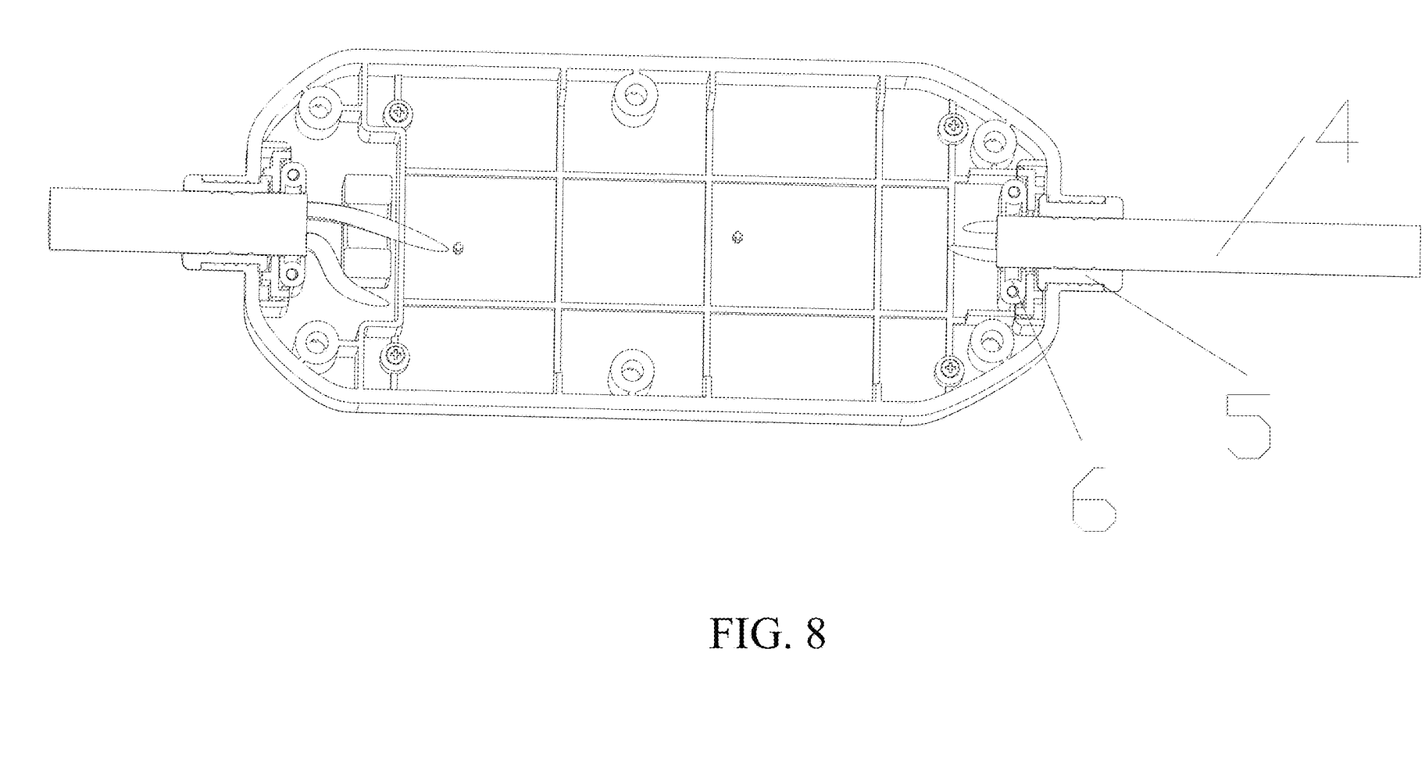
FIG. 8 is along a stereoscopic view taken along line B-B shown in FIG. 2.

Embodiment 2: In some embodiments, as shown in FIGS. 3 and 8, as a preferred embodiment of the present disclosure, the sealing ring 5 has an I-shaped cross-section, and outer diameters of left and right sides of the sealing ring 5 are both greater than an inner diameter of the interface 3.

The sealing ring 5 is made of fluororubber, silicone rubber, or butyl rubber.

The sealing ring 5 is embedded between the interface 3 and the power cord 4, ensuring the sealing between the interface 3 and the power cord 4. Due to the outer diameter of the left and right sides of the sealing ring 5 being greater than the inner diameter of the interface 3, the interface 3 is in interference contact with a middle side wall of the sealing ring 5.

Embodiment 3: In some embodiments, as shown in FIGS. 4, 5, 6, and 7, as a preferred embodiment of the present disclosure, the fixed buckle 6 is located at a lower end of the detachable buckle 7. A middle portion of the fixed buckle 6 and a middle portion of the detachable buckle 7 are symmetrically provided with arc-shaped slots. The arc-shaped slots are fit and in contact with the power cord 4.

A side of the fixed buckle 6 adjacent to the interface 3 is fixedly provided with baffle 8.

Two baffles 8 are provided on front and rear sides of the fixed buckle 6, respectively.

Front and rear sides of the detachable buckle 7 are fixedly provided with bumps 9, respectively. The bump 9 abuts against the baffle 8.

Lower ends of the bumps 9 on the front and rear sides are provided with inclined surfaces 91, respectively. Sloping elements 92 are respectively provided between the detachable buckle 7 and upper ends of the bumps 9 on the front and rear sides. The inclined surfaces 91 and the inclined elements 92 abut against the baffle 8.

The fixed buckle 6 and the detachable buckle 7 are detachably connected through screw 11.

The detachable buckle 7 is locked to the fixed buckle 6 through the screw 11. The inclined surface 91, the inclined element 92, and the baffle 8 cooperate with each other to allow the detachable buckle 7 to move laterally so as to compress the sealing ring 5. In this way, the sealing ring 5 is tightly connected to an inner wall of the interface 3, achieving better waterproof effect.

The front and rear sides of the fixed buckle 6 are provided with threaded holes, respectively. The front and rear sides of the detachable buckle 7 are provided with blind holes matched with the threaded holes of the fixed buckle 6 and serve as screw fastening holes for screws 11.

The screws 11 are M3 flat head screws.

Figure 6:
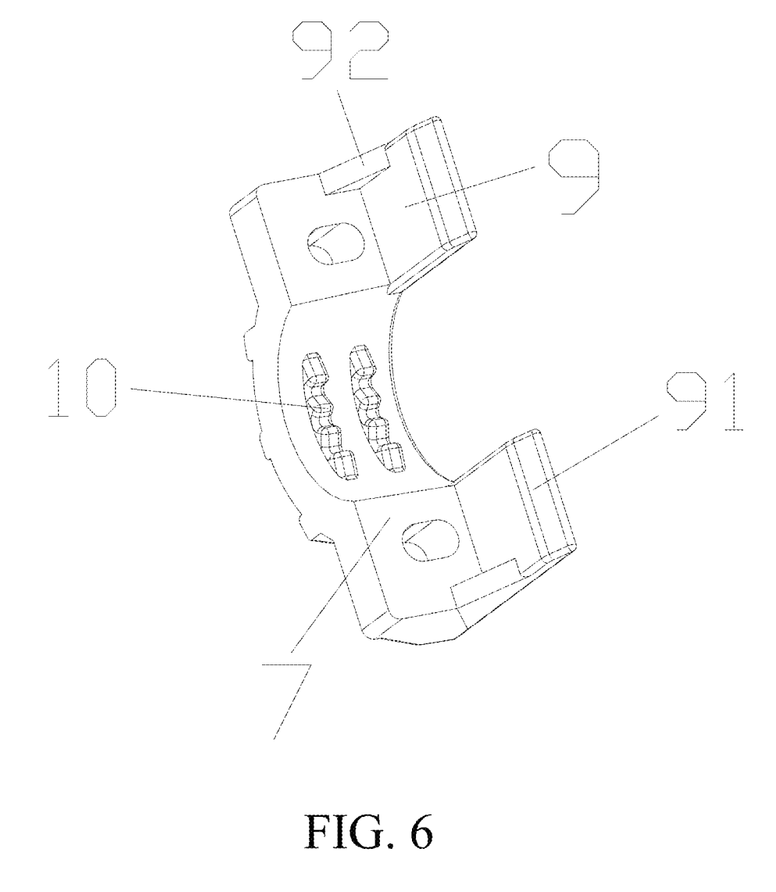
FIG. 6 is a stereoscopic view of a detachable buckle according to the present disclosure.
Figure 7:
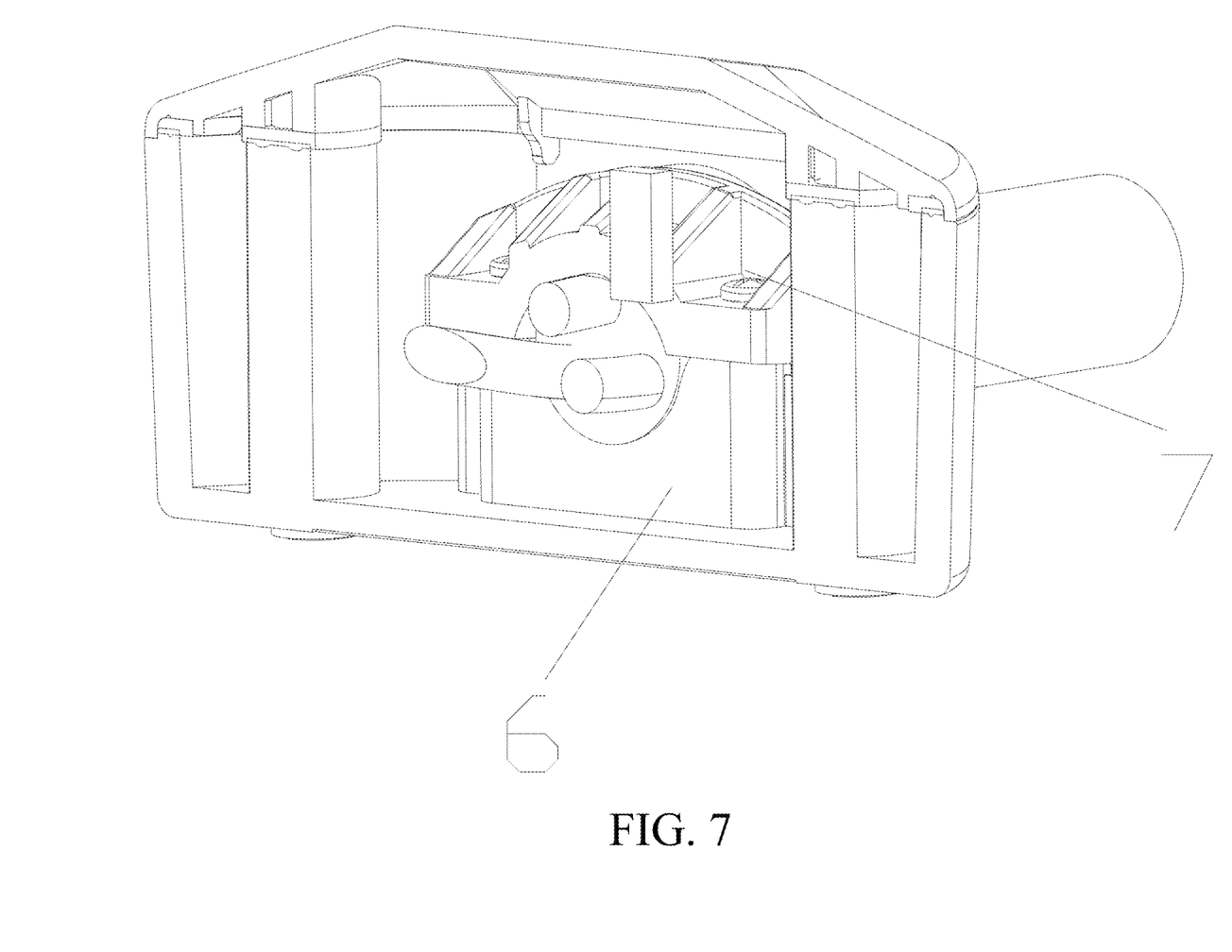
FIG. 7 is along a stereoscopic view taken along line A-A shown in FIG. 2.

Sawteeth 10 are provided in the arc-shaped slot of the detachable buckle 7. The detachable buckle 7 is locked to the fixed buckle 6 through the screws. The sawtooth 10 of the detachable buckle 7 presses down on the power cord 4 to prevent the power cord 4 from loosening due to a user pulling the power cord 4.

The above embodiments are merely intended to describe the technical solutions of the present disclosure, rather than to limit the present disclosure. Although the present disclosure is described in detail according to the above embodiments, those of ordinary skill in the art should understand that modifications can be made to the technical solutions described in the above embodiments or equivalent replacements can be made to some of the technical features. However, these modifications or replacements do not cause the essence of the corresponding technical solutions to depart from the spirit and scope of the technical solutions of the embodiments of the present disclosure.

The invention claimed is:

1. A sealing device for a charging pile interface, comprising a charging pile housing, wherein an upper end of the charging pile housing is fixedly connected to an upper cover through a bolt; each of left and right sides of the charging pile housing is fixedly provided with an interface; a power cord is provided in the interface on the each of the left and right sides of the charging pile housing; and a sealing ring is embedded between the interface and the power cord to ensure sealing; and each of left and right sides of an inner bottom of the charging pile housing is fixedly provided with a fixed buckle; and the fixed buckle is detachably connected to a detachable buckle;

wherein the sealing ring has an I-shaped cross-section; and outer diameters of left and right sides of the sealing ring are greater than an inner diameter of the interface; and wherein the fixed buckle is located at a lower end of the detachable buckle; a middle portion of the fixed buckle and a middle portion of the detachable buckle are symmetrically provided with arc-shaped slots; and the arc-shaped slots are fit and in contact with the power cord.

2. The sealing device for the charging pile interface according to claim 1, wherein a side of the fixed buckle is adjacent to the interface and fixedly provided with a baffle.

3. The sealing device for the charging pile interface according to claim 2, wherein two baffles are provided on front and rear sides of the fixed buckle, respectively.

4. The sealing device for the charging pile interface according to claim 3, wherein each of front and rear sides of the detachable buckle is fixedly provided with a bump; and the bump abuts against the baffle.

5. The sealing device for the charging pile interface according to claim 4, wherein a lower end of the bump on the each of the front and rear sides of the detachable buckle is provided with an inclined surface; an inclined element is provided between the detachable buckle and an upper end of the bump on the each of the front and rear sides of the detachable buckle; and the inclined surface and the inclined element abut against the baffle.

6. The sealing device for the charging pile interface according to claim 5, wherein the fixed buckle and the detachable buckle are detachably connected through a screw.

7. The sealing device for the charging pile interface according to claim 6, wherein the front and rear sides of the fixed buckle are provided with threaded holes, respectively; and the front and rear sides of the detachable buckle are provided with blind holes matched with the threaded holes of the fixed buckle.

8. The sealing device for the charging pile interface according to claim 7, wherein sawteeth are provided in the arc-shaped slot of the detachable buckle.

* * * * *